FIG. 1.

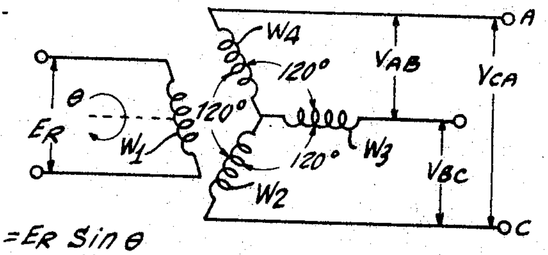

$V_{AB}=E_R \sin\theta$
$V_{BC}=E_R \sin(\theta+120°)=-\tfrac{1}{2}E_R \sin\theta+\tfrac{\sqrt{3}}{2}E_R\cos\theta$
$V_{CA}=E_R \sin(\theta-120°)=-\tfrac{1}{2}E_R \sin\theta-\tfrac{\sqrt{3}}{2}E_R\cos\theta$

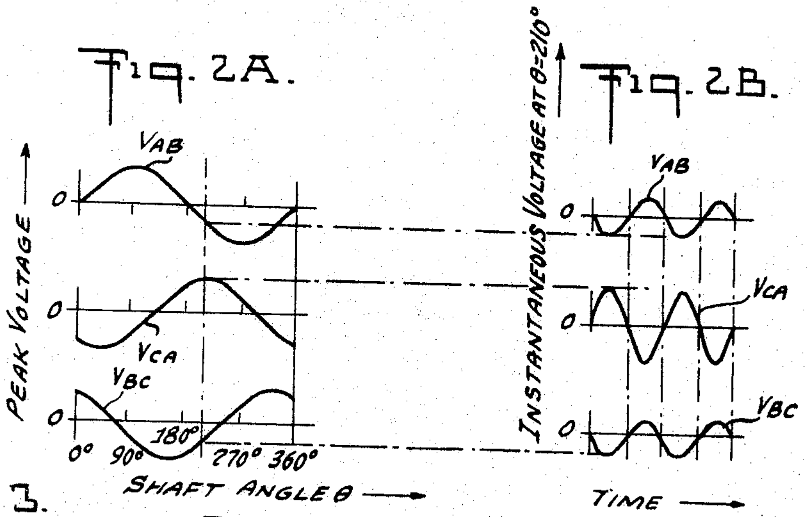
FIG. 2A. FIG. 2B.

FIG. 3.

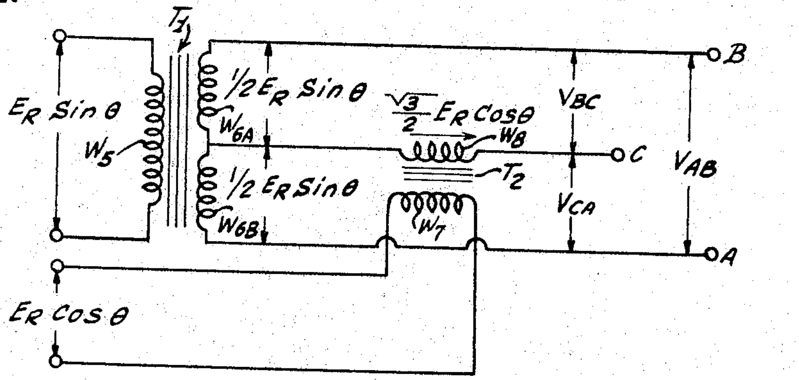

$V_{AB}=\tfrac{1}{2}E_R \sin\theta+\tfrac{1}{2}E_R\sin\theta=E_R\sin\theta$
$V_{BC}=-\tfrac{1}{2}E_R \sin\theta+\tfrac{\sqrt{3}}{2}E_R\cos\theta=E_R\sin(\theta+120°)$
$V_{CA}=-\tfrac{1}{2}E_R \sin\theta-\tfrac{\sqrt{3}}{2}E_R\cos\theta=E_R\sin(\theta-120°)$ INVENTORS
WILLIAM ADLER
HAROLD LEVENSTEIN
GABRIEL R. KERN
BY Hopgood & Calimafde
ATTORNEYS INVENTORS
WILLIAM ADLER
HAROLD LEVENSTEIN
GABRIEL R. KERN
BY Hopgood & Calimafde
ATTORNEYS INVENTORS
WILLIAM ADLER
HAROLD LEVENSTEIN
GABRIEL R. KERN
BY Hopgood & Calimafde
ATTORNEYS INVENTORS
WILLIAM ADLER
HAROLD LEVENSTEIN
GABRIEL R. KERN
BY Hopgood & Calimafde
ATTORNEYS INVENTORS
WILLIAM ADLER
HAROLD LEVENSTEIN
GABRIEL R. KERN
BY
Hopgood & Calimafde
ATTORNEYS INVENTORS
WILLIAM ADLER
HAROLD LEVENSTEIN
GABRIEL R. KERN
BY
Hopgood & Calimafde
ATTORNEYS INVENTORS
WILLIAM ADLER
HAROLD LEVENSTEIN
GABRIEL R. KERN
BY
Hopgood & Calimafde
ATTORNEYS INVENTORS
WILLIAM ADLER
HAROLD LEVENSTEIN
GABRIEL R. KERN
BY Hopgood & Calimafde
ATTORNEYS INVENTORS
WILLIAM ADLER
HAROLD LEVENSTEIN
GABRIEL R. KERN
BY Hopgood & Calimafde
ATTORNEYS INVENTORS
WILLIAM ADLER
HAROLD LEVENSTEIN
GABRIEL R. KERN
BY
Hopgood & Calimafde
ATTORNEYS 3,335,417
Patented Aug. 8, 1967

3,335,417

SYNCHRO-TO-DIGITAL CONVERTER

William Adler, Westbury, Harold Levenstein, Glen Cove, and Gabriel R. Kern, Brooklyn, N.Y., assignors to Servo Corporation of America, Hicksville, N.Y., a corporation of New York Filed Sept. 30, 1963, Ser. No. 312,410
20 Claims. (Cl. 340—347)

This invention relates in general to synchro-to-digital converters and more particularly to two-way converters, i.e., converters which are capable of converting synchro information into digital information and vice versa. The invention is principally characterized by novel means for enabling the same circuits to be used for both digital to synchro and synchro to digital conversions. The invention is further characterized by novel means for performing two-way conversions on a plurality of different channels with a single converter circuit. The invention is also characterized by other novel features which increase the accuracy, reliability and speed of conversion as will be noted in the description which follows.

Snychro systems are electro-mechanical systems in which the angle of a rotatable shaft is converted into three analog voltages which represents the shaft angle and which can be converted back into a shaft angle in other rotatable shafts. Snychro systems have been widely used in the prior art to transmit and duplicate information which is represented by the angular position of a shaft, i.e., the bearing of a ship as measured by the angular position of the master compass shaft, the angle of attack of an aircraft as measured by the angular position of a rotatable vane exposed to the airstream, the bearing and elevation angle of a radar antenna, etc. The shaft angle to be measured is converted into three analog voltages in a synchro transmitter, which is constructed like a small three phase motor with three stator windings and one rotor winding. An A.C. excitation voltage is applied to the rotor winding and the rotor is mechanically coupled to the shaft whose angle is to be measured. Since the voltage induced in each of the three stator windings by the rotor excitation changes in accordance with the angular position of the rotor, the shaft angle is thereby translated into three analog voltages in the stator windings. These analog voltages can be translated back into the corresponding shaft angle by a synchro receiver, which is also constructed like a small three phase motor. In this case, the stator output voltages of the synchro transmitter are coupled to the stator windings of the synchro receiver, whose rotor winding receives the same AC excitation voltage applied to the rotor winding of the synchro transmitter. These voltages set up magnetic fields which cause the synchro receivers rotor to adopt the same shaft angle as the transmitter rotor, thereby translating the voltages back into a shaft angle.

With the growing application of digital computers in automatic navigation systems and the like, it has become increasingly necessary to translate synchro information into digital form for use in computations and then to translate the digital information back into synchro form to perform an operation indicated by the computation. Therefore, various synchro to digital converters and digital to synchro converters have been devised in the past to perform these translations. The most common of these prior art converters are servo-driven shaft encoders, which have been used to translate synchro information into digital information and vice versa. These shaft encoders, however, are extremely slow because the encoder shaft has to rotate mechanically to the measured angle before either conversion can be performed. Because of this slowness, it is not possible to perform two-way conversions with the same shaft encoder except in the relatively few applications where conversion time is unimportant. Also, the slowness of conversion makes it impossible to use one shaft encoder for a plurality of synchro input channels, as are usually present in complex calculations. For example, a typical automatic fire control system for an anti-aircraft gun includes separate synchro input channels representing target range, target velocity, target bearing, target elevation angle, gun bearing and gun elevation angle. This information has to be converted into digital form by six different shaft encoders in order to continuously compute the gun bearing and elevation angle required to hit the target. Furthermore, since the gun mount and target tracking equipment are driven by synchro type circuits, it is necessary to translate the computed gun bearing and elevation angle into synchro form, which usually requires four additional shaft encoders. Therefore, in this relatively simple computer system, the slowness of the shaft encoders requires ten individual units to do a job which could easily be performed by one unit if it were fast enough to handle two-way conversions on a plurality of channels. In more complex computers, of course, the contrast is even more marked.

In an attempt to provide faster conversion, other types of synchro to digital converters have been devised in the past as exemplified by U.S. Patent No. 3,071,324, which was issued on Jan. 1, 1963, to G. Schroeder et al. for a "Synchro to Digital Converter." In the Schroeder converter, the three synchro input voltages are first converted into equivalent sine and cosine voltages by a resolver. The synchro cosine voltage is applied to a function generator comprising a switchable resistor network which is responsive to the tangent of the digital output angle. This produces the product cos $\theta$ tan X, where $\theta$ is the synchro input angle and X is the digital output angle. The product cos $\theta$ tan X is compared to the synchro sine voltage sin $\theta$, which equals cos $\theta$ tan $\theta$, in a comparator circuit whose output drives a digital error correction circuit. The error correction circuit changes the value of the digital output angle until it is equal to the synchro input angle as detected by the comparison between cos $\theta$ tan X and cos $\theta$ tan $\theta$. In brief, the Schroeder circuit operates on the principle of comparing the tangent of the synchro input angle to the tangent of the digital output angle and adjusting the digital output angle until the two tangents are equal, thereby making the digital output angle equal to the synchro input angle.

The Schroeder converter is an improvement over the shaft encoder in the sense that it provides a significant speed up of conversion time, but it cannot be used for two-way conversions, and it is more complex than the shaft encoder. Furthermore, the Schroeder converter is not adapted to handle multiple channel inputs. Therefore it does not solve the basic problems which stem from the slowness of the shaft encoder, i.e., the inability to handle two-way conversions and multiple channel conversions with a single unit.

Accordingly, one object of this invention is to provide a two-way synchro to digital converter having a very short conversion time.

Another object of this invention is to provide a two-way synchro to digital converter which is adapted to handle multiple channel input and output signals.

A further object of this invention is to provide a synchro to digital converter which is simpler, faster and more reliable than those heretofore known in the art.

An additional object of this invention is to provide a digital to synchro converter which is simpler, faster and more reliable than those heretofore known in the art.

Another object of this invention is to provide a two-way, multiple channel synchro to digital converter which is very fast, accurate, simple in structure, and reliable in operation.

Other objects and advantages of the invention will become apparent to those skilled in the art from the following description of several specific embodiments thereof, as illustrated in the attached drawings, in which:

FIG. 1 is a schematic circuit diagram of a prior art synchro transmitter;

FIG. 2A is a graph showing the change of peak output voltage with respect to shaft angle for the synchro transmitter of FIG. 1;

FIG. 2B is a graph showing the change of instantaneous output voltage with respect to time for the synchro transmitter of FIG. 1;

FIG. 3 is a schematic circuit diagram of a prior art resolver for changing three synchro voltages into a pair of sine-cosine voltages and vice versa;

Before discussing the invention, it will be useful to first review the basic operation of prior art synchro systems as illustrated in FIGS. 1, 2A, 2B and 3. Referring to FIG. 1, the prior art synchro transmitters contain a rotor winding W1 and three stator windings W2, W3 and W4 which are connected together in a three phase star configuration. An AC excitation voltage $E_R$ is applied to rotor winding W1, and this excitation voltage induces three output voltages in stator winding W2, W3 and W4 in accordance with the equations noted in FIG. 1. The three synchro output voltages are $V_{AB}$, $V_{BC}$, and $V_{CA}$, whose peak amplitude varies with the shaft angle $\theta$ of the rotor in accordance with the curves shown in FIG. 2A. The instantaneous value of the output voltages for one fixed shaft angle $\theta=210°$ is shown in FIG. 2B, where the frequency of the individual output voltages is equal to the frequency of the excitation voltage $E_R$ and the amplitude of the individual output voltages is equal to the peak amplitude appearing at the corresponding angle in the chart of FIG. 2A, as indicated by the dotted lines extending from FIGS. 2A to 2B.

FIG. 3 shows a prior art resolver which can be used to either change the three synchro voltages into an equivalent pair of sine-cosine voltages or vice versa. This particular resolver is a Scott transformer, which consists of two interconnected transformers T1 and T2 which have the voltage step-up (or step-down) ratios indicated in the figure. Transformer T1 has a 1 to 1 ratio, which means that the voltage applied to winding W5 will induce an equal voltage in winding W6 and vice versa. Winding W6 is centertapped and each half W6A and W6B will therefore have an induced voltage equal to ½ the voltage applied to winding W5. Transformer T2 has a ratio of 1 to $\sqrt{3/2}$, which produces an induced voltage on winding W8 equal to $\sqrt{3/2}$ times the voltage applied to winding W7. When a pair of voltages equal to $E_R$ sine $\theta$ and $E_R$ cos $\theta$ are applied to the left hand terminals as shown in FIG. 3, the equivalent synchro voltages $V_{AB}$, $V_{BC}$ and $V_{CA}$ are produced at the right hand terminals in accordance with the equations shown in FIG. 3. Conversely, when the synchro voltages $V_{AB}$, $V_{BC}$ and $V_{CA}$ are applied to the right hand terminals, the voltages $E_R \sin\theta$ and $E_R \cos\theta$ will be produced at the left hand terminals in accordance with the same equations. In this invention, the translating action of the resolver is utilized in both directions, as will be explained in connection with the circuits of FIGS. 4 and 5.

Figures 4, 6:
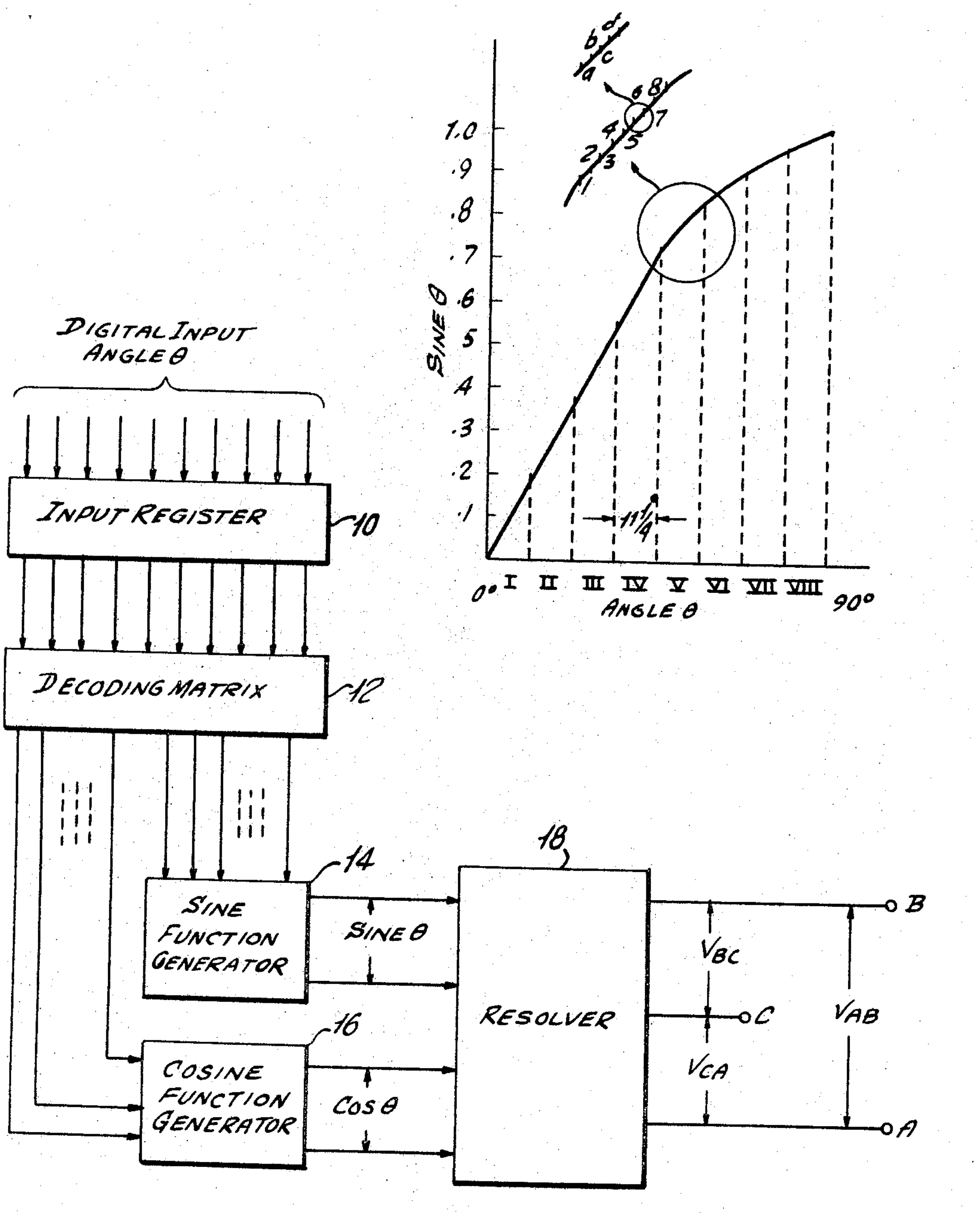
FIG. 4 is a block diagram of the basic digital to synchro converter circuit of this invention.
FIG. 6 is a graph showing one exemplary method of approximating a sine function in accordance with this invention.

FIG. 4 shows the basic digital to synchro conversion method employed in this invention. The digital input angle $\theta$ is applied to an input register 10, whose output is applied to a decoding matrix 12, which is adapted to detect the quadrant of the angle and translate it into a first quadrant equivalent angle. The output of decoding matrix 12 is applied to a sine function generator 14 and a cosine function generator 16, which produce output voltages proportional to the sine and cosine of the digital input angle $\theta$. These sine and cosine voltages are applied to the sine-cosine input terminals of a resolver 18, which produces the equivalent synchro output voltages $V_{AB}$, $V_{BC}$ and $V_{CA}$, thereby translating the digital input angle into an equivalent synchro output angle. Any suitable decoding matrix and sine-cosine function generators can be used to mechanize this basic digital to synchro converter circuit, which will provide one-way digital to synchro conversion on one channel.

Figure 5:
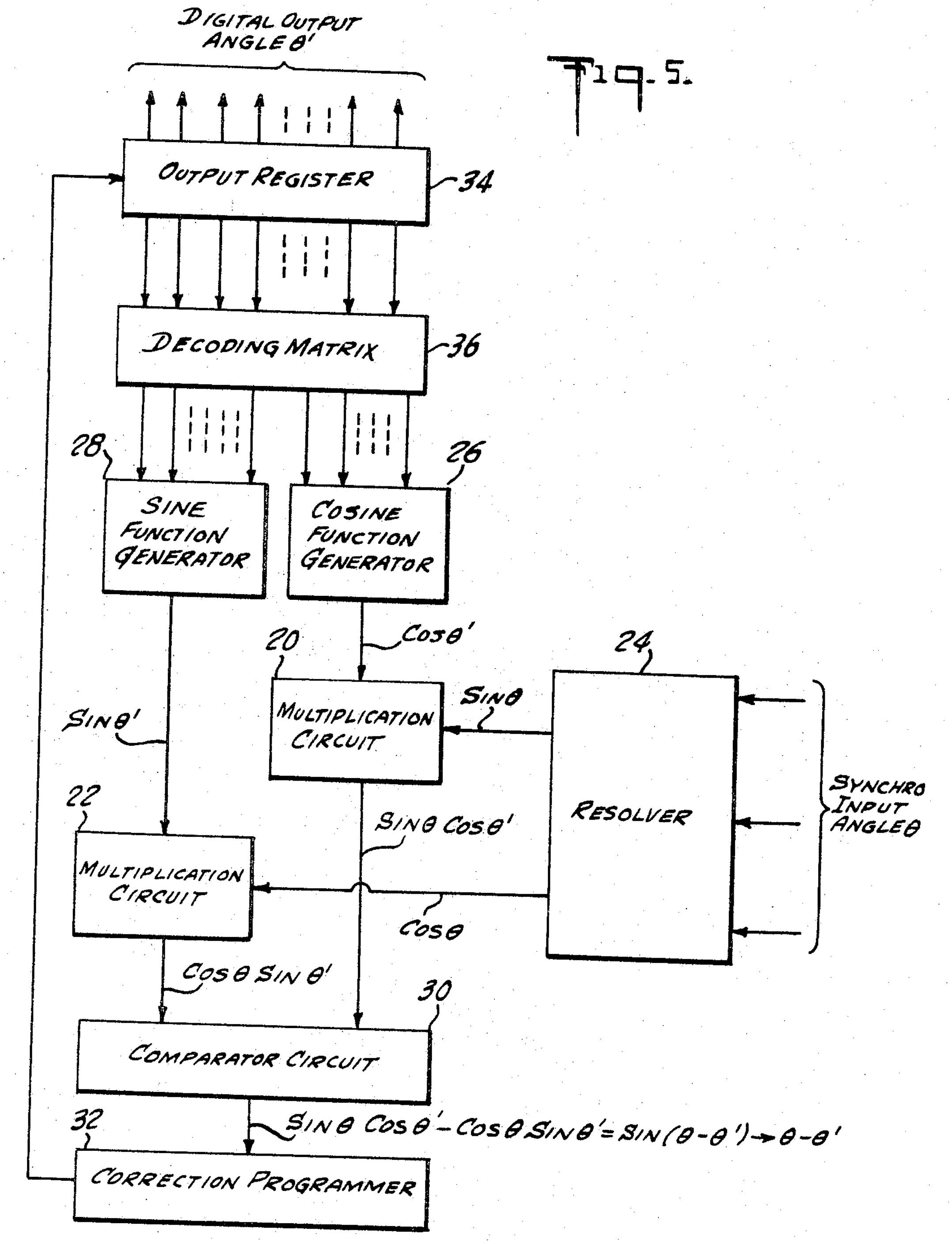
FIG. 5 is a block diagram of the basic synchro to digital converter circuit of this invention.

FIG. 5 shows the basic synchro to digital converter circuit of this invention. One very important feature of this invention resides in the basic method used to convert from synchro to digital. Instead of comparing tangent and cotangent functions, as taught in the prior art, the circuit of this invention compares the cross product $\sin\theta \cos\theta'$ to the cross product $\cos\theta \sin\theta'$, where $\theta$ is the synchro input angle and $\theta'$ is the digital output angle. The novel cross product comparison technique of this invention has several important advantages over the prior art conversion techniques. In the first place, the functions sine $\theta'$ and cos $\theta'$ are produced by the sine and cosine function generators of the digital to synchro converter circuit of FIG. 4, and the functions $\sin\theta$ and $\cos\theta$ can be produced by the resolver of FIG. 4 by merely applying the synchro input voltages to its synchro output terminals. This makes it possible to utilize all of the basic digital to synchro converter circuits in the synchro to digital conversion process.

More specifically, the novel synchro to digital conversion process of this invention comprises forming the cross products $\sin\theta \cos\theta'$ and $\cos\theta \sin\theta'$, where $\theta$ is the synchro input angle and $\theta'$ is the digital output angle, then comparing the two cross products, and adjusting the value of the digital output angle $\theta'$ until the two cross products are equal. On its face, this process appears to be unsuitable, since the difference between the cross products is not equal to the difference between the synchro angle $\theta$ and the digital angle $\theta'$. But since $\sin\theta \cos\theta' - \cos\theta \sin\theta' - \sin(\theta-\theta')$, and since $\sin(\theta-\theta')$ approaches $\theta-\theta'$ as $\theta'$ approaches $\theta$, the cross product comparison technique gives an exact conversion. In other words, there is an error in the cross product comparison when the digital output angle $\theta'$ differs from the synchro input angle $\theta$, but this error approaches zero as $\theta'$ approaches $\theta$ and it vanishes when $\theta'$ is equal to $\theta$.

As shown in FIG. 5, the cross products are formed in multiplication circuits 20 and 22, which receive $\sin\theta$ and cos θ inputs from a resolver 24 and sin θ' and cos θ' inputs from function generators 26 and 28. The two cross products are applied to a comparator circuit 30, which substracts one cross product from the other and produces an output signal proportional to their difference. The output of comparator 30 is applied to a correction programmer 32, which changes the digital angle stored in output register 34 until the two cross products are equal, at which time the digital output angle θ' will equal the synchro input angle θ. The angle stored in output register 34 is coupled to a decoding matrix 36, which serves the same function as the decoding matrix 12 in FIG. 4, i.e., it detects the quadrant of the angle and changes it into the equivalent first quadrant angle, whose sine and cosine are generated in function generators 26 and 28. It should be noted that output register 34, decoding matrix 36, function generators 26 and 28, and resolver 24 can be the same circuits used in FIG. 4 for the one-way digital to analog conversion. As noted above, this duplication of function results from the cross product comparison technique.

Figure 7:
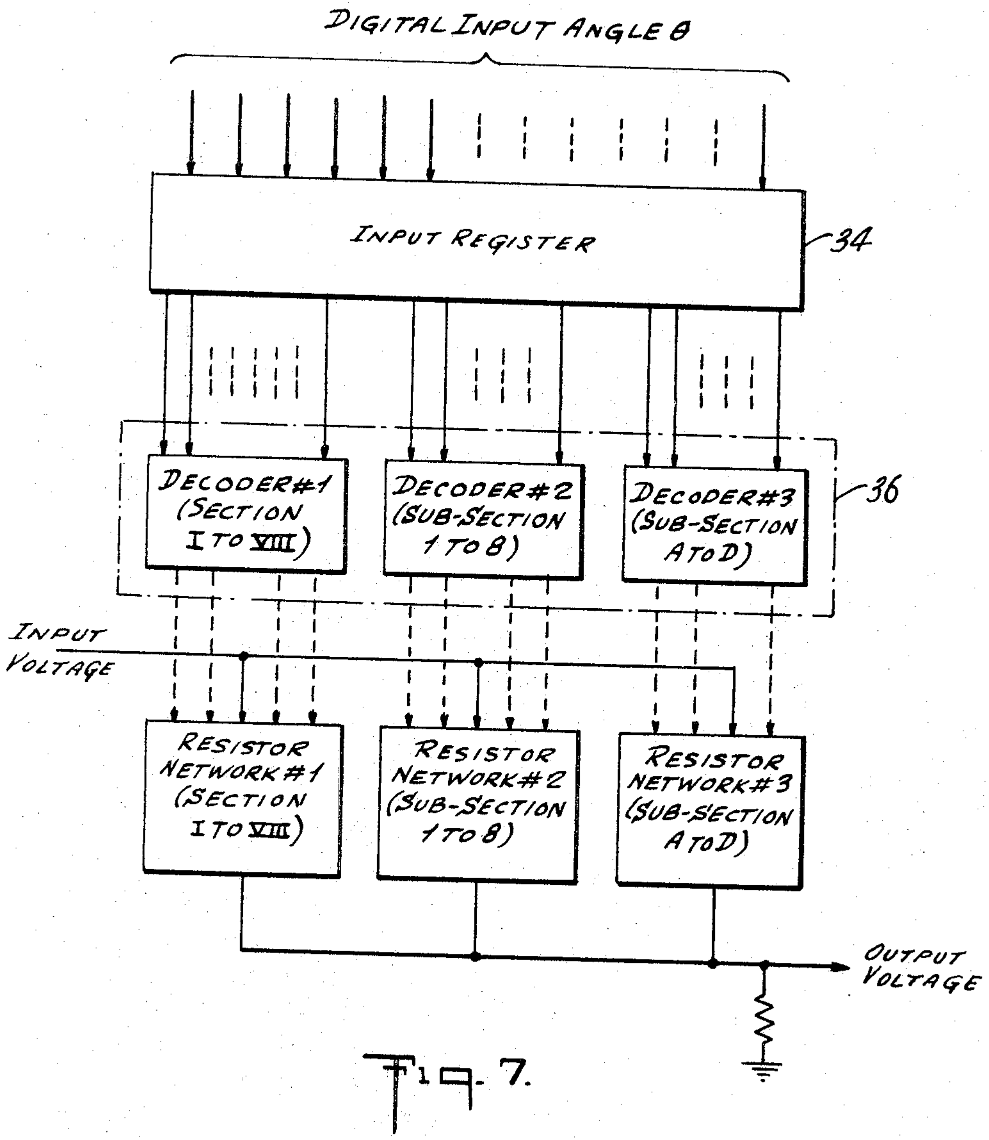
FIG. 7 is a block diagram of the novel function generator of this invention.

Before discussing the basic two-way converter circuit of this invention, we will first describe the novel function generator circuit, which makes it possible to combine function generators 26 and 28 with multiplication circuits 20 and 22, thus significantly simplifying the synchro to digital converter circuit described above. The novel function generator circuit, which is shown in FIGS. 7 and 8, produces a straight line approximation of the sine or cosine curve from 0° to 90° according to the breakdown shown in FIG. 6. The sine or cosine curve is divided into 8 sections I through VIII, each of which is subdivided into sub-sections 1 through 8, which are further subdivided into sub-sections A through D. This breakdown divides the 0–90° angular range into 256 equal increments, which is equal to the number of digital increments in the same angular range with a 10-bit binary number representing angles from 0 to 360 degrees. A ten-bit binary angle is preferable because the first eight bits of a 10-bit angle are the first quadrant equivalent of the angle and the last two bits identify the quadrant of the angle. This means that the sine function can be generated by examining the last eight bits of the digital angle and selecting the same increment on the approximate sine curve shown in FIG. 6.

The sine function is synthesized in a voltage divider network which includes three parallel branches, one branch corresponding to each level of division shown in FIG. 6. Each branch is a switchable T network which receives a common input voltage and feeds a common load. As shown in FIG. 7, resistor network #1 provides a voltage output which is a function of the section I to VIII location of the digital angle, resistor network #2 provides a voltage output which is a function of the sub-section 1 to 8 location of the angle, and resistor network #3 furnishes a voltage output which is a function of the sub-section A to D location. These three voltages are combined together in a common load resistor to provide an output voltage which is proportional to the sine of the angle.

The desired resistor values of each voltage divider network are chosen by switching circuits which are controlled by digital decoders operable to indicate the section and sub-section location of the digital angle stored in output register 34. As shown in FIG. 7, the decoder is divided into three sections, one for controlling each of the three voltage divider networks. The decoder is coupled to digital register 34, and produces output signals indicating the corresponding section and sub-sections occupied by the digital angle in register 34. These output signals are used to switch the resistance values of the corresponding voltage divider network, as will be explained more fully in connection with the specific decoder circuit and voltage divider networks shown in FIGS. 8A and 8B.

Figure 8A:
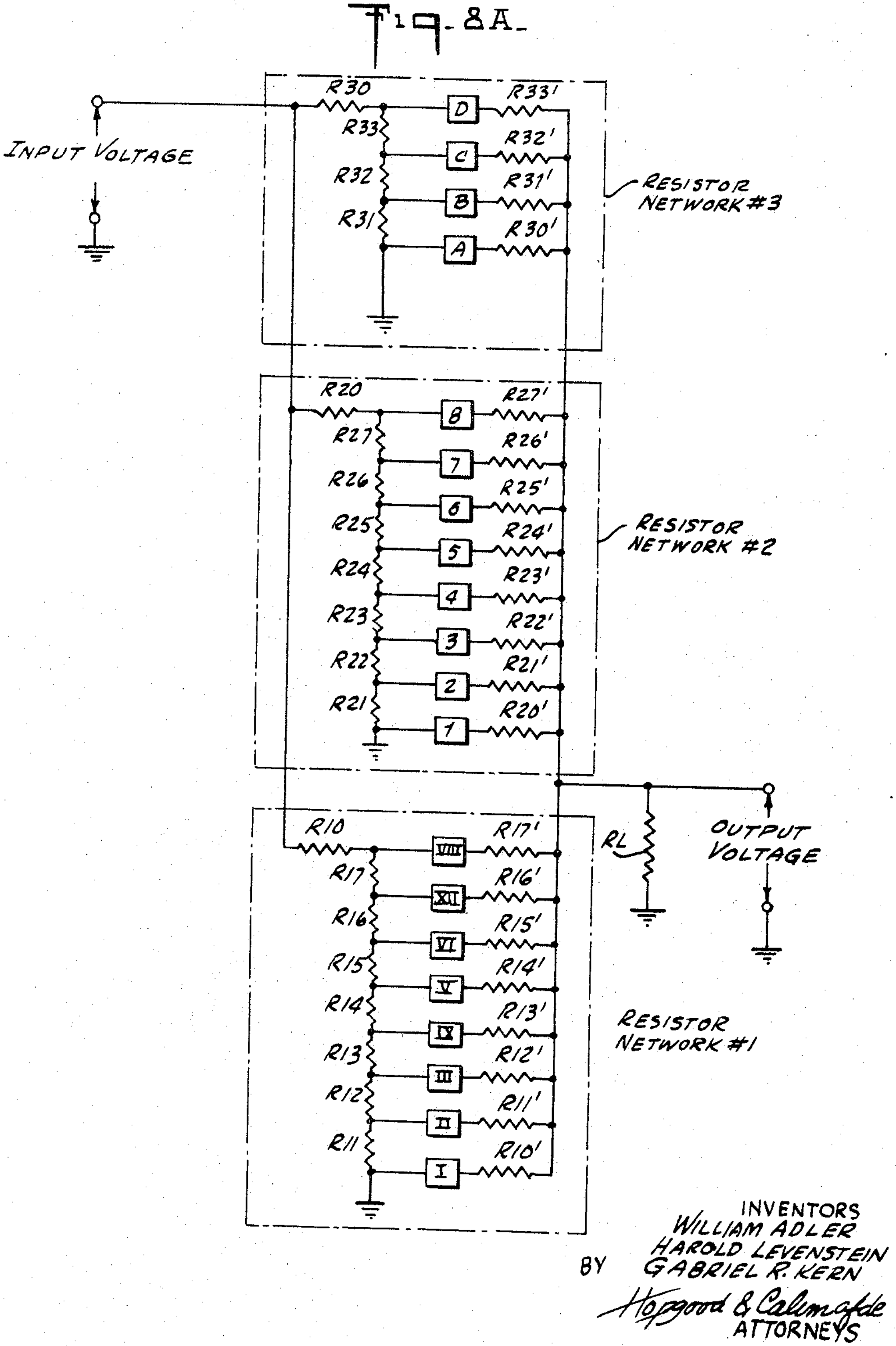
FIG. 8A is a schematic circuit diagram of one illustrative set of resistor networks which can be used in the function generator of FIG. 7.
Figure 8B:
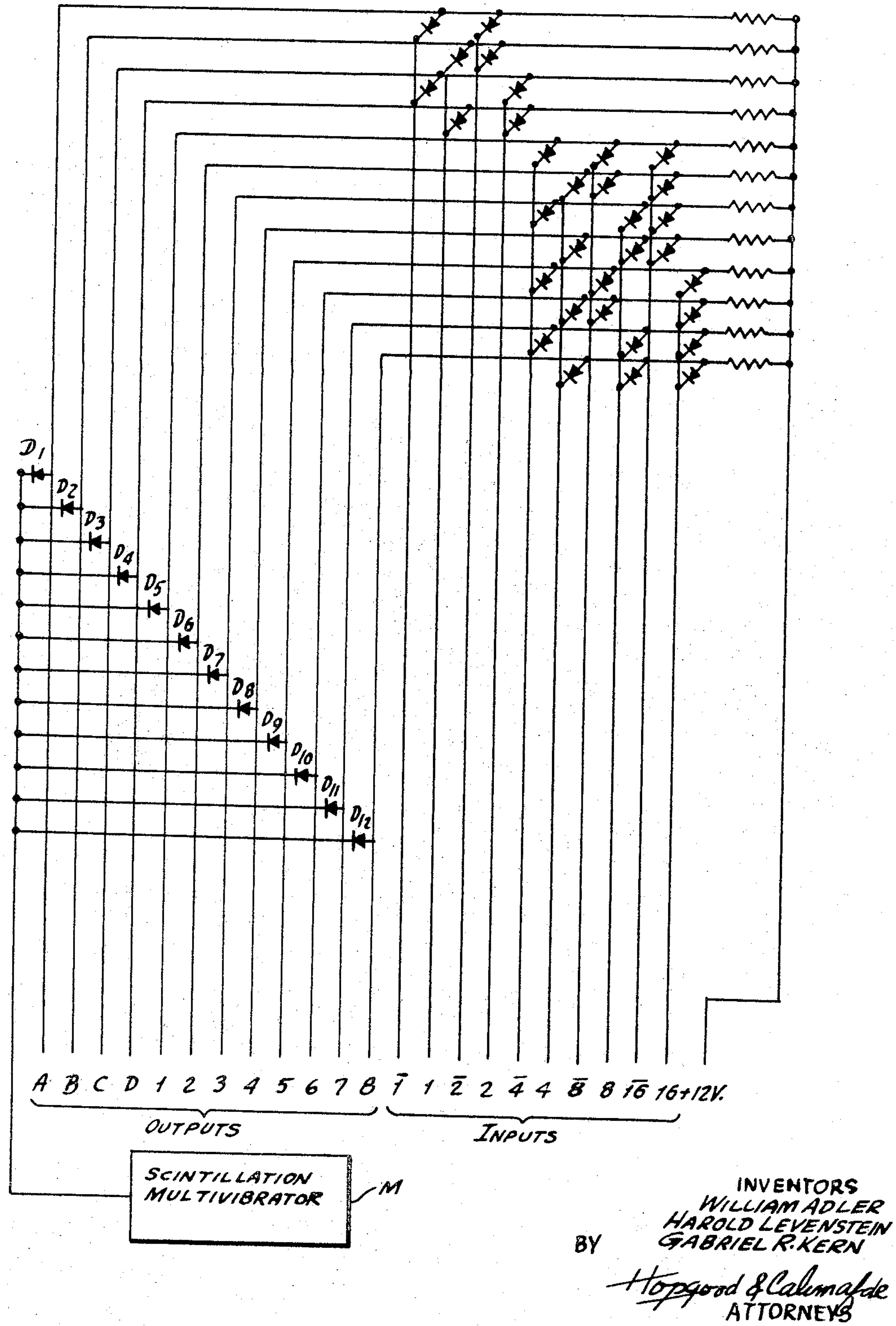
FIG. 8B is a schematic circuit diagram of one illustrative decoder circuit which can be used in the function generator of FIG. 7.

FIG. 8A shows an illustrative set of voltage divider networks which can be used in the function generator of this invention and FIG. 8B shows a decoder which can be used to decode sub-sections 1 to 8 and A to D. The rectangular boxes in FIG. 8A represent normally open switches which are selectively closed by the output signals of the corresponding decoder sections to provide the appropriate resistance values. The numbers and letters in the boxes represent the angular sub-divisions shown in FIG. 6. When the digital input angle falls within the angular segment indicated by each letter and number, the corresponding switch is closed by a signal from the decoding matrix. For every angle, one switch will be closed in each of the resistor networks. For example, with an input angle of 40°, switches IV, 4 and C would be closed, since 40° occupies section IV, sub-section 4, sub-section C of the breakdown shown in FIG. 6. The values of the resistors in this network are selected to provide a total output voltage proportional to the sine or cosine of the angle represented by each possible combination of three switches.

Referring to FIG. 8A, each digital angle activates three parallel T voltage divider networks whose resistance values are selected to provide a total output voltage proportional to the sine of the corresponding angle. All 8 of the T networks in resistor network #2 are selected to provide a constant output impedance K1 and all 4 of the T networks in resistor network #3 are selected to provide a constant output impedance K2. This assures that a change in the voltage increment provided by these two networks will not effect the voltage increment provided by the other networks. The output impedance of the T networks in resistor network #1 varies with each voltage increment, however, so as to vary the voltage contribution of the other two networks. In other words, resistor network #1 acts as a scale factor for the other two resistor networks. This is due to the fact that resistor network #1 represents a series of straight line segments I through VIII having different slopes, while resistor networks #2 and #3 represent linear subdivisions of a selected line segment with a constant slope. A change in the slope of a line segment will effect the voltage increment provided by each subdivision of the line segment, but a change in the total number of voltage increments provided by the subdivisions will not effect the slope of the line or the increment provided by each subdivision. In other words, the individual T networks in resistor network #3 are selected to provide 4 equal output voltage steps with a constant output impedance K1, the individual T networks in resistor network #2 are selected to provide 8 equal output voltage steps with a constant output impedance K2, the individual T networks in resistor network #1 are selected to provide 8 unequal voltage increments which are each proportional to the side of the corresponding angle, and the individual T networks in resistor network #1 are selected to provide 8 different output impedances Z1 . . . Z8 which act to set the proper scale factor for the 8 equal voltage increments provided by resistor network #2 and the 4 equal voltage increments provided by resistor network #3.

With the above described general principles as a guide, the proper value for each resistor can be easily calculated from well known resistor network formulas, but for the sake of clarity one suitable set of resistor values for the sine function is listed below.

| | |
|---|---|
| **R30**—0 | **R30'**—30K |
| **R31**—8K | **R31'**—24K |
| **R32**—8K | **R32'**—22K |
| **R33**—8K | **R33'**—24K |
| **R20**—0 | **R20'**—4,285.7Ω |
| **R21**—2,488.33Ω | **R21'**—2,152.85Ω |
| **R22**—2,488.33Ω | **R22'**—730.95Ω |
| **R23**—2,488.33Ω | **R23'**—20Ω |
| **R24**—2,488.33Ω | **R24'**—20Ω |

| | |
|---|---|
| R25—2,488.33Ω | R25′—730.95Ω |
| R26—2,488.33Ω | R26′—2,152.85Ω |
| R27—2,488.33Ω | R27′—4,285.7Ω |
| R10—0 | R10′—988.44Ω |
| R11—780.21Ω | R11′—361.61Ω |
| R12—710.95Ω | R12′—92.732Ω |
| R13—594.60Ω | R13′—75.886Ω |
| R14—450.58Ω | R14′—165.853Ω |
| R15—297.48Ω | R15′—236.989Ω |
| R16—149.67Ω | R16′—213.507Ω |
| R17—16.51Ω | R17′—73.619Ω |
| | $R_L$—10K |

The same set of values can also be used to generate the cosine function by simply complementing the digital input angle, since the cosine of an angle between 0 and 90 degrees is equal to the sine of its complement.

The decoding matrices required to operate the resistor networks will be readily apparent to those skilled in the art. Decoding matrix #1 simply examines the digital angle and actuates one of the switches I to VIII depending on which of the eight major sections that the angle occupies. If the angle between 0° and 11.25°, switch I will be actuated, if it is between 11.25° and 22.5°, switch II will be actuated, and so on. Many suitable decoding circuits for performing this function are well known to those skilled in the art, and any suitable circuit can be used to mechanize this decoder. It is preferable, however, to use a circuit similar to the one in FIG. 8B, which shows one suitable mechanization for decoders #2 and #3.

Referring to FIG. 8B, decoders #2 and #3 receive inputs from the five lowest order bits of the binary angle. These inputs are represented by the numbers 1, 2, 4, 8 and 16, which are customarily used to represent the first five bits of a binary number. The numbers with the bars above them represent the complement of the corresponding bit. These inputs are applied to a matrix of diode AND gates, whose operation will be apparent to those skilled in the art without further explanation. The output of the diode matrix is developed on 12 output conductors, which correspond respectively to sub-sections A to D and 1 to 8 of the angular subdivisions shown in FIG. 6. For each 5-bit input, two output conductors will be energized with a positive voltage, one from the group A to D, and the other from the group 1 to 8, as well be apparent to those skilled in the art from an examination of the diode matrix. These output voltages, however, are periodically grounded through output gate diodes D1 to D12, which are periodically turned on and off by a rectangular voltage waveform produced by a free running multivibrator M. This periodic switching or scintillation of the decoder output is not an essential feature of the invention, but it is highly preferable because it improves the action of the switches in the resistor networks, as will be explained in detail in later paragraphs.

The above described function generator has the advantages of simplicity, reliability and accuracy, but for the purposes of this invention it has the even more important advantage of dual functions which are particularly valuable synchro to digital conversions. As noted in connection with FIG. 5, the novel synchro to digital converter of this invention uses cross products sine $\theta$ cos $\theta'$ and cos $\theta$ sine $\theta'$, where $\theta$ is the synchro input angle and $\theta'$ is the digital output angle. As explained in the foregoing paragraphs, the function generator of this invention provides an output voltage which is proportional to sine $\theta'$ and cos $\theta'$. However, if a voltage proportional to sine $\theta$ is applied to the cos $\theta'$ resistor network in place of the reference voltage $E_R$, the output voltage will be proportional to the product sine $\theta$ cos $\theta'$, and if a voltage proportional to cos $\theta$ is applied to the sine $\theta'$ resistor network in place of the reference voltage, the output voltage will be proportional to the product cos $\theta$ sine $\theta'$. Thus the novel function generator of this invention can be used to generate both the sine $\theta'$ and cos $\theta'$ functions needed for the digital to synchro conversion and the sine $\theta$ cos $\theta'$ and cos $\theta$ sine $\theta'$ cross-products needed for the synchro to digital conversion. The importance of this dual function capability will be more apparent from a consideration of the circuit of FIG. 9, which shows the basic two-way converter circuits of this invention.

Figure 9:
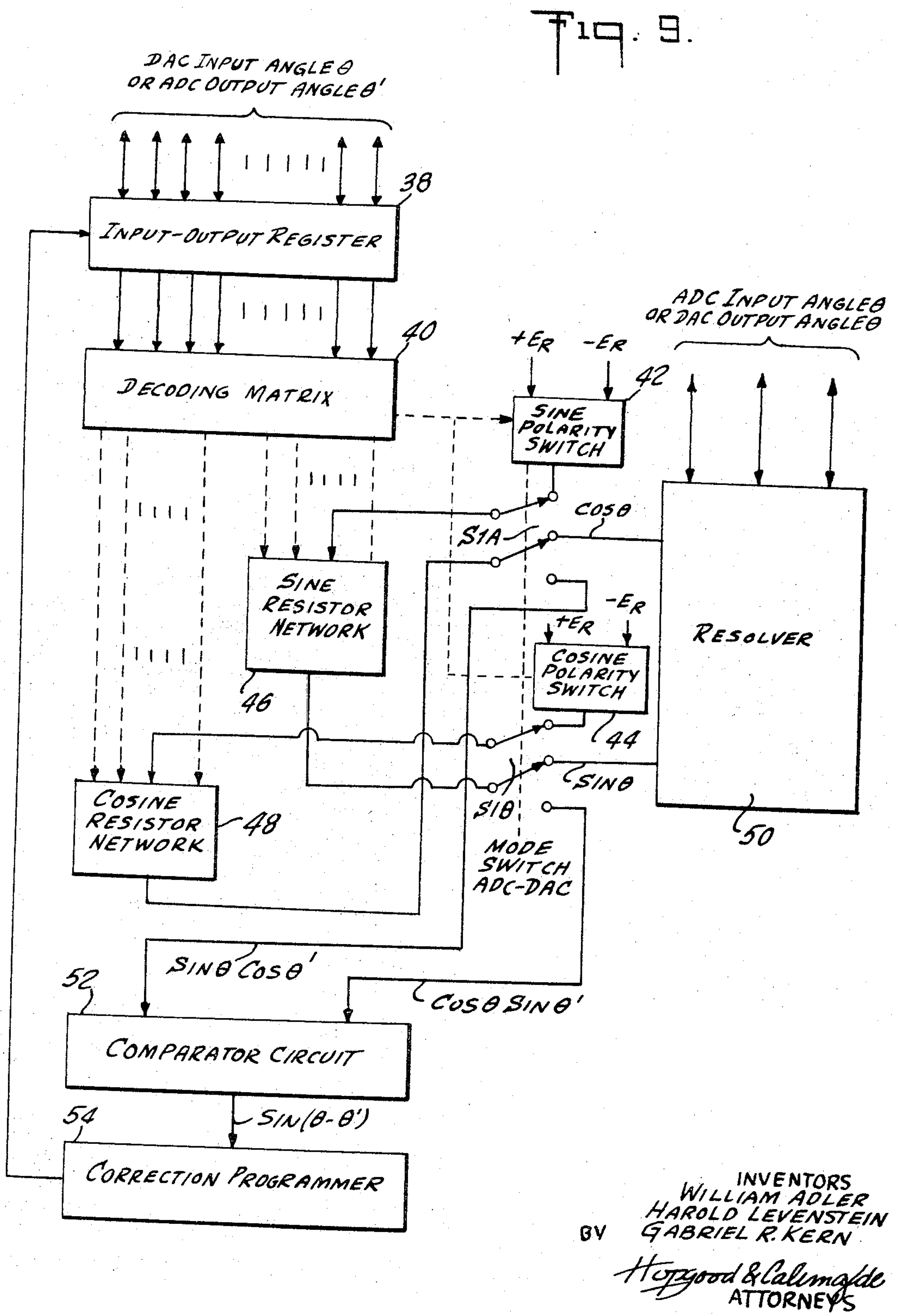
FIG. 9 is a block diagram of the basic two-way synchro to digital converter circuit of this invention.

The two-way converter circuit of this invention is essentially a combination of the digital to analog converter circuit shown in FIG. 4 with the synchro to digital converter circuit shown in FIG. 5 and the dual-purpose function generator shown in FIG. 7. A simple mode switch serves to switch the converter circuit from its synchro to digital mode of operation to its digital to synchro mode of operation. The mode switch is shown in FIG. 9 in the digital to synchro (DAC) position. In this mode of operation, a 10-bit digital input angle is applied to input-output register 38, which is coupled to a decoding matrix 40. The decoding matrix detects the quadrant of the input angle by examining the two high order bits, and actuates sine and cosine polarity switches 42 and 44, which are simply electronic single-pole double-throw switches that choose the polarity of the reference voltage applied to the corresponding sine and cosine resistor networks 46 and 48. The decoding matrix also translates the digital angle into the equivalent first quadrant angle by examining the 8 low order bits and detects the angular location of the first quadrant angle by means of decoding circuits such as shown in FIG. 8B. The output signals of the latter circuits are applied to the sine and cosine resistor networks, which select output voltages proportional to the sine and cosine of the angle. The reference voltage $+E_R$ or $-E_R$ is applied to these resistor networks and develops a voltage proportional to the sine and cosine of the digital angle. In this connection, it should be noted that the reference voltages in this embodiment are AC voltages and that the + and − signs relate to phase relationships rather than to DC polarity. In other words, $-E_R$ is an AC voltage which is equal in frequency and amplitude to $+E_R$ but 180° out of phase. Therefore the output of the sine and cosine resistor networks are AC voltages proportional to the sine and cosine of the digital angle in register 38. These AC voltages are applied through mode switches S1A and S1B to resolver 50, which produces synchro output voltages corresponding to the digital angle.

In the synchro to digital mode of operation, synchro input voltages are applied to resolver 50, which then produces output voltages proportional to sine $\theta$ and cos $\theta$. These voltages are applied through mode switches S1A and S1B to the sine and cosine resistor networks, the sine $\theta$ voltage being applied to the cosine resistor network and the cos $\theta$ voltage being applied to the sine resistor network. Therefore the output of the sine and cosine resistor networks are AC voltages proportional to the cross products sin $\theta$ cos $\theta'$ and cos $\theta$ sin $\theta'$. These cross products are applied through mode switches S1A and S1B to a comparator circuit 52, which produces an output signal proportional to the difference between the cross product voltages. The output of comparator circuit 52 is applied to correction programmer 54, which changes the value of the digital angle in register 38 until the cross products are equal, at which time the digital angle 6′ will be equal to the synchro input angle $\theta$.

It will be apparent that the two-way converter circuit of FIG. 9 makes maximum utilization of its component parts, since every circuit component except the comparator, correction programmer, and polarity switches are used in both conversions. This economy of components results principally from the cross product comparison technique and the dual purpose function generator of this invention. It will also be apparent to those skilled in the art that the mechanical mode switch could be replaced by electronic switching circuits to speed up the process of switching from one mode of operation to the other.

Figure 10:
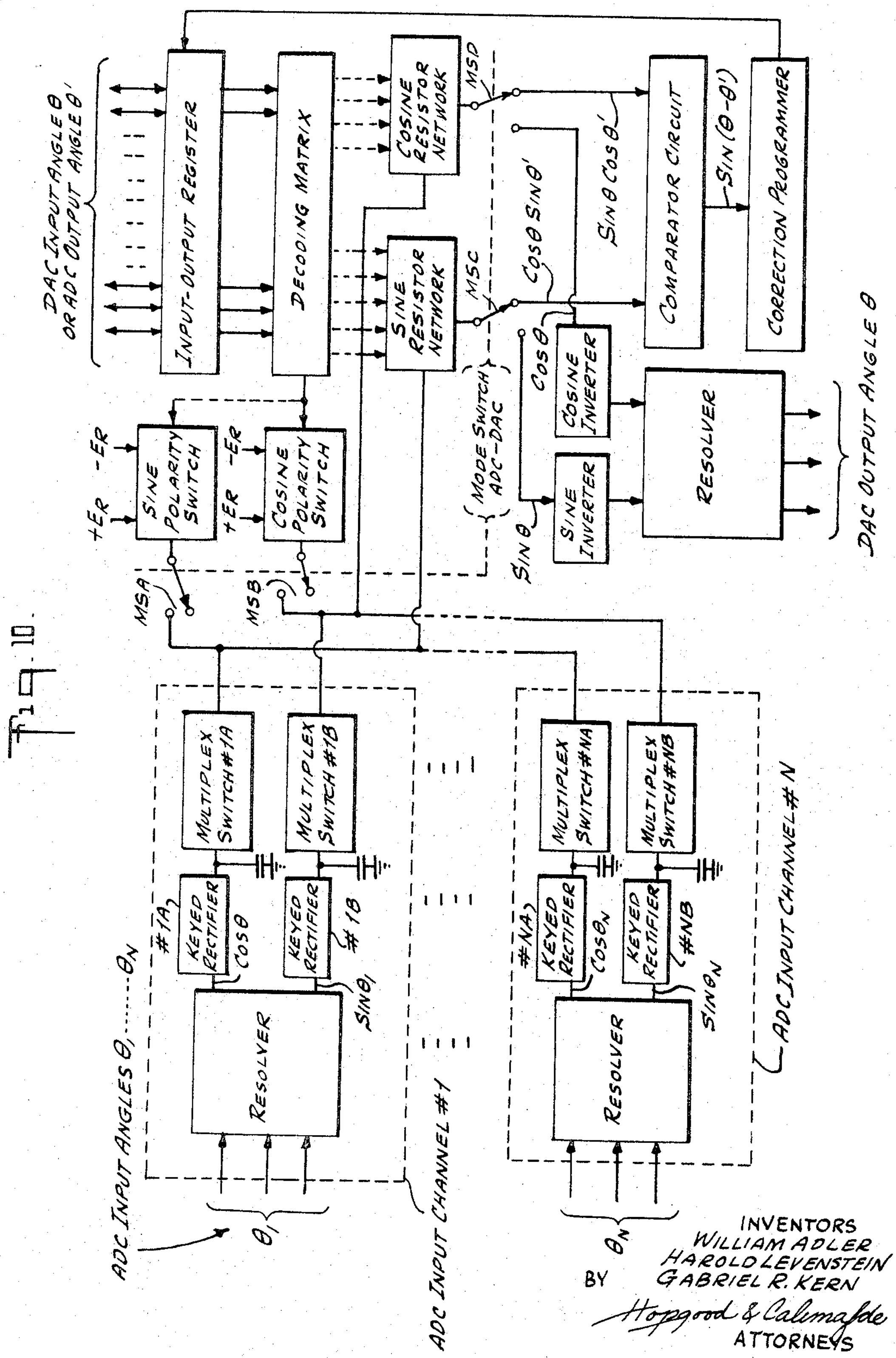
FIG. 10 is a block diagram of a multiple channel two-way synchro to digital converter of this invention.

FIG. 10 shows a multi-channel two-way converter circuit of this invention. This circuit is fundamentally the same as the circuit of FIG. 9, but it has been altered from AC to DC operation and it contains a plurality of synchro input channels instead of a single synchro input channel. With plural inputs, DC operation is preferable because it provides much faster switching from channel to channel and it also provides signals which can be easily stored. The synchro input channels each contain a resolver which receives synchro information and converts it into sine $\theta$ and cos $\theta$, a pair of keyed rectifier-filter circuits which changes the sine $\theta$ and cos $\theta$ voltages into DC levels, and multiplex switches which connect the DC sine $\theta$ and cos $\theta$ voltages to the converter circuit in time sequence. These DC sine $\theta$ and cos $\theta$ voltages are applied to sine and cosine resistor networks 46 and 48, which produce cross product output voltages as explained previously. The synchro to digital conversion process then follows the same course described in connection with FIG. 9. The digital to synchro conversion process differs, however, in that DC reference voltages $E_R$ and $-E_R$ are used to produce the sine $\theta$ and cos $\theta$ outputs, and these voltages must be transformed into corresponding AC voltages. For this purpose, inverters 56 and 58 are coupled between the output of the resistor networks and the input of resolver 50.

Figure 11:
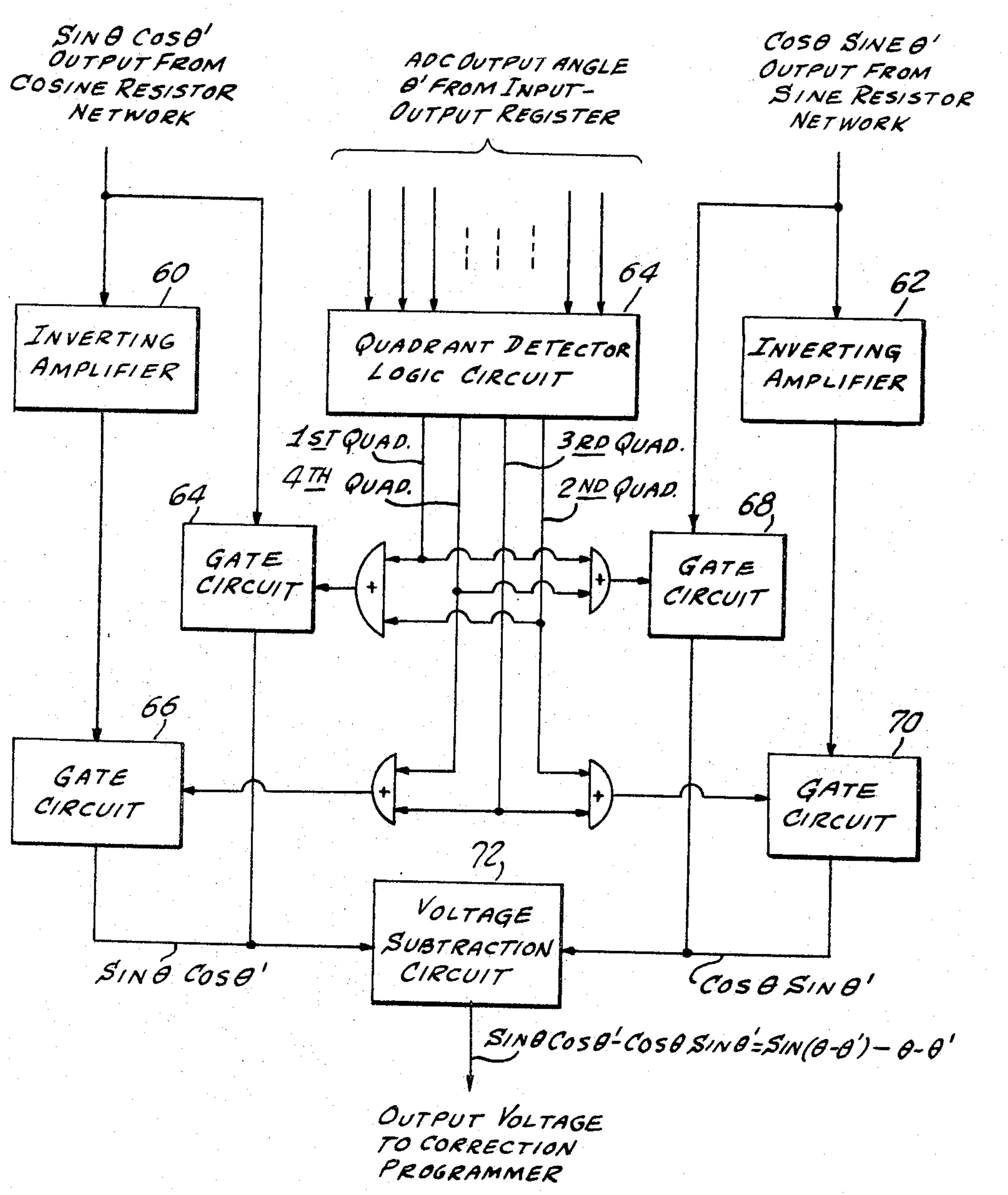
FIG. 11 is a block diagram of one illustrative comparator circuit which can be used in the converter circuits of FIGS. 5, 9 and 10.

FIG. 11 shows one illustrative comparator circuit which can be used in the converter circuits shown in FIGS. 5, 9 and 10. This particular comparator circuit is adapted to detect the quadrant occupied by the digital output angle $\theta'$ and to correct the sign of the two cross products in accordance with this information. It is necessary to correct the sign of the cross products because the values sine $\theta'$ and cos $\theta'$, which enter into the product as resistance values, have no polarity, and thus the cross product output voltages will always have the polarity of the sine $\theta$ and cos $\theta$ terms, which will be incorrect half of the time. This sign correction is executed by applying the cross-product outputs of the resistor networks to inverting amplifiers 60 and 62 and then selecting either the input or the output of the inverting amplifiers for comparison purposes depending on the quadrant of the angle. The quadrant is detected by quadrant detector logic circuit 64, which opens gate circuits 64 through 70 in accordance with the following logic:

| Quadrant | Gate 64 | Gate 66 | Gate 68 | Gate 70 |
|---|---|---|---|---|
| First | Enabled | Disabled | Enabled | Disabled. |
| Second | Enabled | Disabled | Disabled | Enabled. |
| Third | Disabled | Enabled | Disabled | Enabled. |
| Fourth | Disabled | Enabled | Enabled | Disabled. |

The above noted logic is embodied in the OR gates coupled between quadrant detector logic 64 and gate circuits 64 through 70. By means of this logic, the sign of the cross-products applied to voltage subtraction circuit 72 is corrected so that the output of the voltage subtraction circuit represents the true difference between the cross-products.

Figure 12:
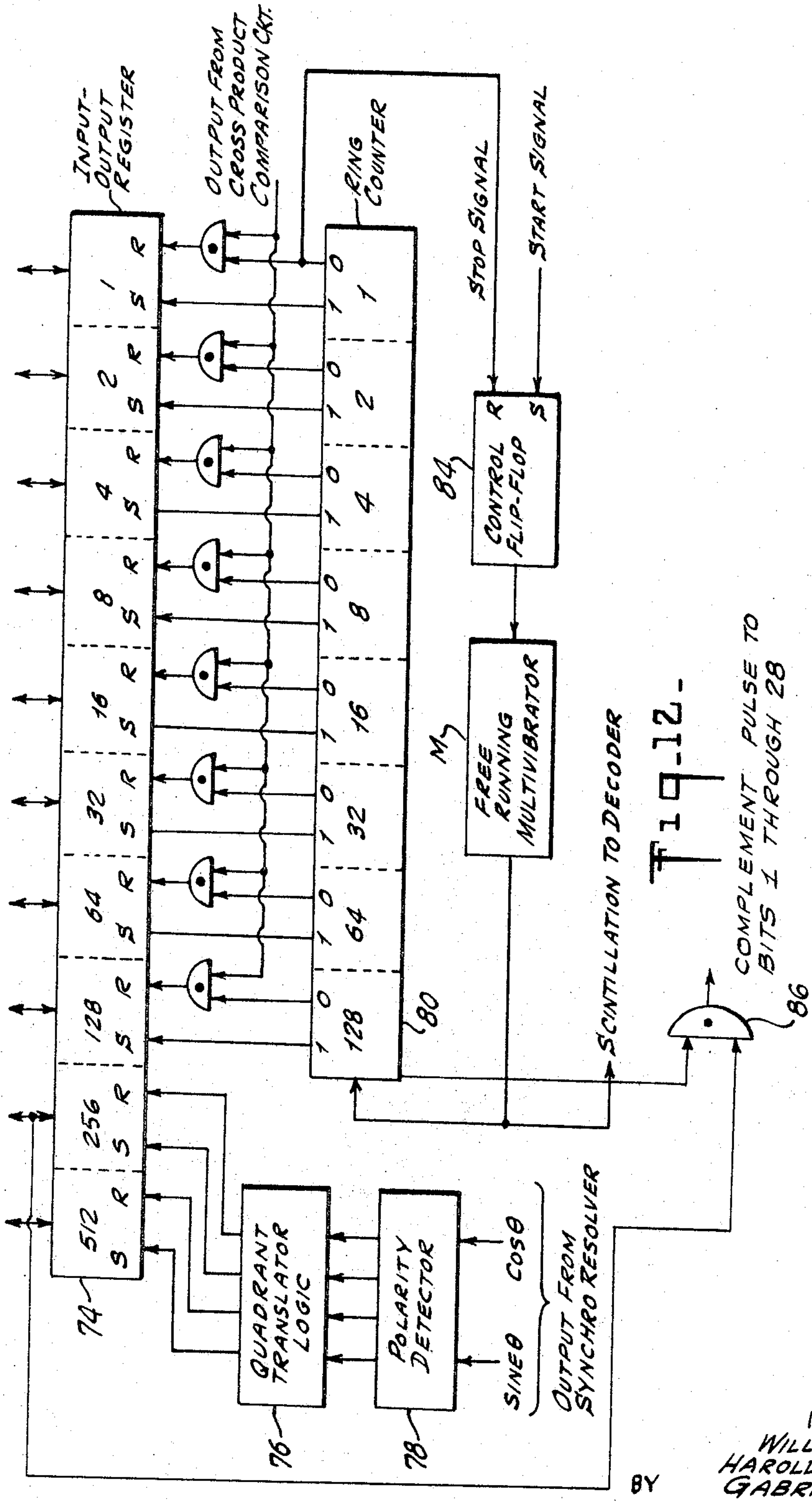
FIG. 12 is a block diagram of one illustrative correction programmer which can be used in the converter circuits of FIGS. 5, 9 and 10.

FIG. 12 shows one illustrative correction programmer that can be used in the embodiments of FIGS. 5, 9 and 10. This particular correction programmer contains several novel features that make it much faster, simpler, and more reliable than those heretofore known in the art. The correction programmer works on the principle of arbitrarily inserting binary "1's" into the individual stages of the digital register, beginning with the highest order stage, then checking the accuracy of the register by means of a cross-product comparison, leaving the "1" in the individual stage if the comparison shows that the digital angle is below or equal to its correct value, removing the "1" if the comparison shows that the digital angle is above its correct value, and then repeating the insertion-removal process for each stage of the register in sequence from the highest order stage to the lowest order stage. By this simple process, the correct digital value is inserted into the register in N steps where N is the number of stages in the digital register. FIG. 12 shows a ten-stage digital register 74 in which the correction program for the 8 lowest order stages is carried out according to this principle. The correction program is started by setting a control flip-flop 84, which enables a free running multivibrator M that applies periodic input pulses to ring counter 80. As each stage of the ring counter is triggered to the "1" state, it inserts a binary "1" into the corresponding stage of output register 74 via the set input terminal S. The total digital number is automatically checked for accuracy by the cross product comparison circuits, and if the total digital number is greater than its correct number, the inserted "1" will be removed when the corresponding ring counter stage returns to its 0 state. This is accomplished by means of an AND gate input to the reset terminal R of the output register stage. A pulse will be passed through the AND gate when the ring counter stage goes from 1 to 0 if the output from the cross-product comparison circuit indicates that the digital angle is larger than its correct value. If the digital angle is lower than or equal to its correct value, the AND gate will be disabled, and no pulse will be applied to the reset terminal, thereby leaving the output stage in its "1" state. As the count progresses down the ring counter, binary "1's" are inserted in each output register stage in turn, and then either left in or removed according to the output of the cross-product comparison circuit. At the end of the counter sequence, the correct digital values will be contained in the last 8 stages of the register, and the correction program will be terminated by a stop signal applied from the last stage of the ring counter to the reset terminal R of control flip-flop 84. This correction program is only used for the first eight stages of the digital register because these are the only stages which effect the magnitude of the sine and cosine. The last two stages effect only the polarity of the sine and cosine, and their correct value can be determined directly by detecting the quadrant of the synchro input angle. This is done by quadrant detector logic 76, which receives signals indicating the polarity of sine $\theta$ and cos $\theta$ from polarity detector 78. The relationship between the polarity of the sine and cosine functions is well known to those skilled in the art, and so is the relationship between the quadrant and the binary value of the two highest order bits. Therefore, the logic circuits necessary to mechanize these simple functions will be readily apparent to those skilled in the art. The quadrant detector logic 76 also develops a complement pulse via AND gate 86 in the second and fourth quadrants. This pulse is developed whenever the 256 stage of register 74 is set and the 128 stage of ring counter 80 is reset from 0 to 1 at the end of the ring counter sequence. It will be apparent to those skilled in the art that the 256 stage of register 74 will only be set in the second and fourth quadrants, whereby the complement pulse will only be developed in the second and fourth quadrants.

In addition to controlling the correction program, free running multivibrator M also applies a scintillation signal to the function generator decoders as illustrated in FIG. 8B to improve the operation of the switches used in the resistor networks of the function generator. Under ordinary conditions, it would be extremely difficult to design suitable switches for the function generators, since the switches must be very fast acting and very stable for the full duration of their "on" time, which can vary at random from several micro-seconds to several hours depending on the digital input angles. The difficulty arises from the fact that fast acting analog switches are inherently unstable over long periods of time, while stable analog switches are inherently slow acting. In accordance with the scintillation feature of this invention, this dilemma of switch design is circumvented by scintillating the function generator switches in synchronism with the correction program, i.e., turning the switches off and on in between the individual steps of the correction program. This allows fast acting analog switches to be used in the circuit without incurring any limitations due to their long time instability. And since the comparator output is only utilized during the individual steps of the correction program, the scintillation does not effect the output in any way except to make it more accurate due to the fast, stable switching action that results from the scintillation.

From the foregoing description it will be apparent that this invention provides a novel synchro to digital converter circuit which is capable of performing two-way conversions on a plurality of channels. It will also be apparent that this invention provides a novel synchro to digital converter circuit which is faster, similar, and more reliable than those heretofore known in the art. And it should be understood that this invention is by no means limited to the specific circuits disclosed herein, since many modifications can be made in the disclosed circuit without departing from the basic teaching of this invention. For example, although mechanical mode selection switches are shown in the two-way converter circuits of FIGS. 9 and 10, it will be apparent to those skilled in the art that these switches can be replaced by relays or solid state switches without altering the basic operation of the circuit. In addition, although the circuit of FIG. 10 only shows multiple channel inputs, it will be obvious to those skilled in the art that multiple channel outputs can be easily provided by using a multiplex switching system in the output circuits as well as in the input circuits. Furthermore, it is not necessary to use the novel function generator, decoding circuits, comparator circuit, correction programmer, and scintillation technique in the basic two-way converter of this invention. Many other circuits are known in the art for performing these functions, and any suitable circuit can be used to mechanize the basic two-way converter of this invention. These and many other modifications will be apparent to those skilled in the art, and this invention includes all modifications falling within the scope of the following claims.

We claim:

1. In a circuit for receiving analog input signals representing an input angle $\theta$ and digital means for producing digital output signals representing an output angle $\theta'$, the improvement comprising means for generating signals proportional to the products sine $\theta$ cos $\theta'$ and cos $\theta$ sine $\theta'$, comparison means for comparing the two product signals to each other, and correction means responsive to the output of said comparison means and coupled to said digital means for varying the digital output signals until the two products are equal, thereby producing a digital output angle $\theta'$ which is equal to the analog input angle $\theta$.

2. The combination defined in claim 1 in which said means for generating signals proportional to the products comprises means responsive to said input signals to produce signals proportional to sine $\theta$ and cosine $\theta$, means responsive to said output signals to produce signals proportional to sine $\theta'$ and cosine $\theta'$, means operable to multiply the signals proportional to sine $\theta$ and cosine $\theta'$ to produce a signal proportional to the cross product sine $\theta$ and cos $\theta'$, and means operable to multiply the signals proportional to cosine $\theta$ and sine $\theta'$ to produce a signal proportional to the product cos $\theta$ sine $\theta'$.

3. The combination defined in claim 1 in which said means for generating signals proportional to the products comprises means responsive to said input signals to produce signals proportional to sine $\theta$ and cosine $\theta$, a first function generator responsive to said output signals to produce signals proportional to $E_R$ sine $\theta$, where $E_R$ is a reference voltage applied to a reference input terminal of said first function generator, a second function generator responsive to said output signals to produce signals proportion to $E_R$ cosine $\theta$, where $E_R$ is a reference voltage applied to a reference input terminal of said second function generator, said signal proportional to cosine $\theta$ being applied to said reference input terminal of said first function generator, and said signal proportional to sine $\theta$ being applied to said reference input terminal of said second function generator, thereby producing signals proportional to sine $\theta$ cos $\theta'$ and cos $\theta$ sine $\theta'$.

4. The combination defined in claim 1 wherein said correction means comprises means for inserting a binary 1 into the individual bits of the digital output signals in time sequence starting with a high order bit and progressing down to the lowest order bit, and means for changing each individual binary 1 to a binary 0 if the output of said comparison means indicates that the angle represented by said digital signals exceeds the angle represented by said analog signals.

5. The combination defined in claim 1 in which said means for generating signals proportional to the products comprises a first function generator responsive to said digital output signals to produce signals proportional to $E_R$ sine $\theta'$, where $E_R$ is a reference voltage applied to a reference input terminal of said first function generator, a second function generator responsive to said output signals to produce signals proportional to $E_R$ cosine $\theta'$, where $E_R$ is a reference voltage applied to a reference input terminal of said second function generator, said signal proportional to cosine $\theta$ being applied to said reference input terminal of said first function generator, and said signal proportional to sine $\theta$ being applied to said reference input terminal of said second function generator, thereby producing signals proportional to sine $\theta$ cos $\theta'$ and cos $\theta$ sine $\theta'$.

6. The combination defined in claim 5 wherein said correction means comprises means for inserting a binary 1 into the individual bits of the digital output signals in time sequence starting with a high order bit and progressing down to the lowest order bit, and means for changing each individual binary 1 to a binary 0 if the output of said comparison means indicated that the angle represented by said digital signals exceeds the angle represented by said analog signals.

7. The combination defined in claim 6 in which each of said function generators comprises a first variable T voltage divider network and a second variable T voltage divider network connected in parallel to a common load impedance, a reference voltage applied to each of said variable T voltage divider networks, and means for varying the output of said variable T voltage dividers in accordance with said digital input signals to produce an output voltage proportional to the corresponding function thereof.

8. The combination defined in claim 7 in which the output impedance of one of said variable T networks is constant and the output impedance of the other variable T network is variable.

9. A synchro to digital converter comprising means for receiving synchro input signals representing a synchro input angle $\theta$, means for producing digital output signals representing a digital output angle $\theta'$, means for generating signals proportional to the products sine $\theta$ cos $\theta'$ and cos $\theta$ sine $\theta'$, comparison means for comparing the two product signals to each other, and correction means responsive to the output from said comparison means and coupled to said digital producing means for varying the digital output signals until the two products are equal, thereby producing a digital output angle $\theta'$ which is equal to the analog input angle $\theta$.

10. A two-way synchro to digital converter comprising resolver means for translating signals representing a synchro input angle $\theta$ into signals proportional to sine $\theta$ and cosine $\theta$ and for translating signals proportional to since $\theta$ and cosine $\theta$ into signals representing a synchro output angle $\theta$, means for receiving digital input signals representing a digital input angle $\theta$ and for generating digital output signals representing a digital output angle θ', means responsive to said digital means for generating signals proportional to sine θ' and cosine θ', means for applying said sine θ' and cosine θ' signals to said resolver means to produce signals representing a synchro output angle θ which is equal to the digital input angle θ', means for generating signals proportional to the products sine θ cos θ' and cos θ sine θ', comparison means for comparing the two product signals to each other, and correction means responsive to the output from said comparison means and coupled to said means for generating digital output signals for varying the digital output signals until the two products are equal, thereby producing a digital output angle θ' which is equal to the synchro input angle θ.

11. The combination defined in claim 9 and also including a plurality of additional resolver means, rectifier means coupled to the sine θ and cosine θ output signals of each additional resolver means to produce DC signals proportional to the sine θ and cosine θ output signals of the corresponding resolver, said signals proportional to sine θ and cosine θ' being DC signals, switch means for applying the sine θ and cosine θ output signal of each resolver to said means for generating said signals proportional to said products, thereby producing a series of digital output angles each equal to the synchro input angle applied to a corresponding resolver means, and inverter means coupled between said means proportional to sine θ' and cosine θ' and said first mentioned resolver means to change said DC sine θ' and cosine θ' signals into AC signals.

12. The combination defined in claim 11 wherein said rectifier means comprise keyed rectifiers, and also including scintillation means coupled to said comparison means, said scintillation means being operable to periodically actuate said comparison means in synchronism with the operation of said correction means.

13. The combination defined in claim 12 wherein said correction means includes a ring-counter, each stage of said ring-counter being coupled to the corersponding stage of a digital input-output register, a free-running multivibrator coupled to said ring-counter, means for starting said free running multivibrator to step said ring-counter through a counting sequence, each stage of said ring-counter being operable to insert a binary 1 into the corresponding stage of said input-output register and to change the binary 1 to a binary 0 if the output of said comparison means indicates that the angle represented by said digital signals exceeds the angle represented by said analog signals.

14. The combination defined in claim 13 wherein the binary 1 output terminal of each of said ring-counter stages is coupled to the "set" input terminal of the corresponding input-output register stage and the binary 0 output terminal of each of said ring-counter stages is coupled to a corresponding AND gate, the output of said AND gate being coupled to the "reset" input terminal of said corresponding input-output register stage, and means for enabling each of said AND gates when the output of said comparison means indicates that the angle represented by said digital signals exceeds the angle represented by said analog signals.

15. The combination defined in claim 14 wherein each of said AND gates is coupled to the output of said comparison means to enable each of said AND gates when the output of said comparison means indicates that the angle represented by said digital signals exceeds the angle represented by said analog signals.

16. A two way synchro-to-digital and digital-to-synchro converter including means to select synchro-to-digital or digital-to-synchro operation comprising first resolver means responsive to three synchro voltages defining a variable angle θ to a pair of sine and cosine voltages at an angle θ, second means responsive to said pair of sine θ and cosine θ voltages to provide a digital signal corresponding to an angle θ', and a pair of sine and cosine voltages at an angle θ', third means responsive to the output of said first and second means for multiplying the voltages sine θ, cosine θ' to obtain a first product signal, and cosine θ' and sine θ to obtain a second product signal, and fourth means to compare the two product signals, and fifth correcting means responsive to the output of said comparison means coupled to said second means to vary said voltages by varying the angle θ' thereof.

17. The converter of claim 16 the elements thereof functioning in the digital to synchro mode, wherein said second means is responsive to an input digital angle θ to provide a pair of sine and cosine voltages at an angle θ; said first resolver means providing three synchro output voltages at an angle θ from said pair of sine and cosine voltages.

18. Within a function generator employing a plurality of variable T voltage divider networks, means for determining the value of a monotonic function in response to digital input thereto representing one known variable of said functions, comprising:

a reference voltage input to each of said variable T voltage divider networks, means for varying the voltage output of all but one of said plurality of variable T networks by equal voltage increments in response to said digital inputs, means for varying the voltage output of the remaining one of said plurality of variable T networks in response to said digital inputs to establish a basic value range of said function, means for varying the impedance of said one remaining variable T network in response to said digital inputs to establish the desired value of said voltage increments provided by said all but one of said variable T networks, whereby said one remaining variable T network establishes the scale factor for said equal voltage increments, and means for adding the output voltages of all of said variable T networks to determine the value of said functions.

19. In a function generator responsive to intermittent digital inputs and containing analog switches responsive to said digital inputs to control circuits that determine the output of said generator, an improvement comprising:

means for cycling said analog switches in the interim of such digital inputs comprised of scintillating means coupled to said analog switches to periodically open and close said switches during the periods when not being activated by said digital input.

20. The converter of claim 17 wherein said second means responsive to an input digital angle θ to provide a pair of sine and cosine voltages at an angle θ comprises a decoding matrix responsive to said input digital angle θ coupled to means for determining the value of a monotonic function in response to said digital input, said decoding matrix including means to detect the quadrant of the input digital angle θ, and said means for determining the value of a monotonic function comprising a plurality of variable T voltage divider networks, a reference voltage input to each of said variable T voltage divided networks, means for varying the voltage output of all but one of said plurality of variable T networks by equal voltage increments in response to said digital inputs, means for varying the voltage output of the remaining one of said plurality of variable T networks in response to said digital inputs to establish a basic value range of said function, means for varying the impedance of said one remaining variable T network in response to said digital inputs to establish the desired value of said voltage increments provided by said all but one of said variable T networks, whereby said one remaining variable T network establishes the scale factor for said equal voltage increments, and means for adding the output voltages of all of said variable T networks to determine the value of said functions.

References Cited

UNITED STATES PATENTS

| | | | |
|---|---|---|---|
| 2,865,564 | 12/1958 | Kaiser et al. | 340—347 |
| 2,869,115 | 1/1959 | Doeleman et al. | 340—347 |
| 3,180,976 | 4/1965 | Robinson | 340—347 |

OTHER REFERENCES

Digital Control of Position Servos Requiring Minor Arc Operations, by T. E. Nolan et al., RCA Technical Note, June 1960.

DARYL W. COOK, *Acting Primary Examiner.*

MAYNARD R. WILBUR, *Examiner.*

W. J. KOPACZ, *Assistant Examiner.*